Sept. 23, 1958    D. B. CARLSON    2,852,826
CANVAS COUPLER END CLIP
Filed June 7, 1956
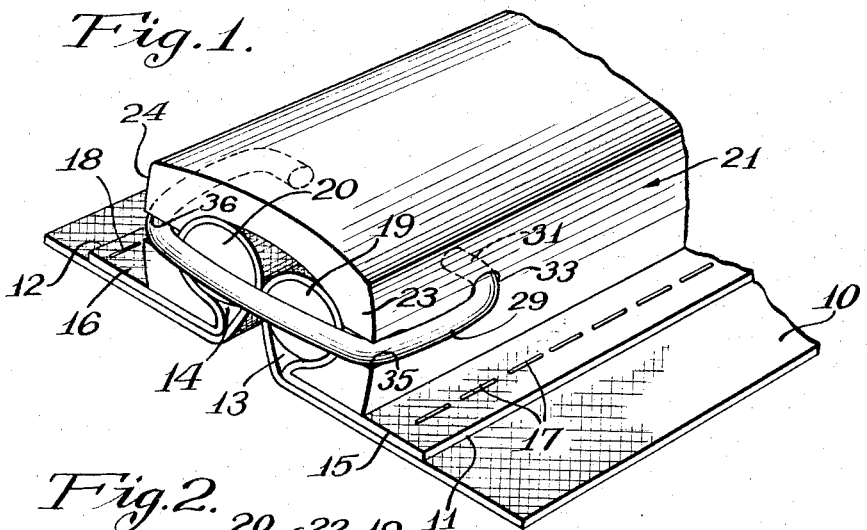
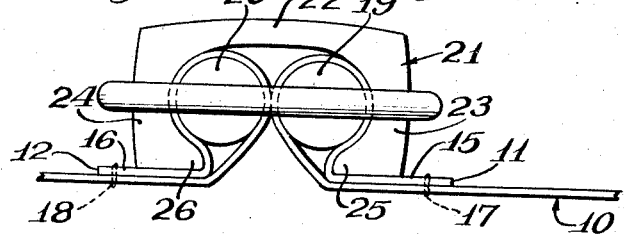
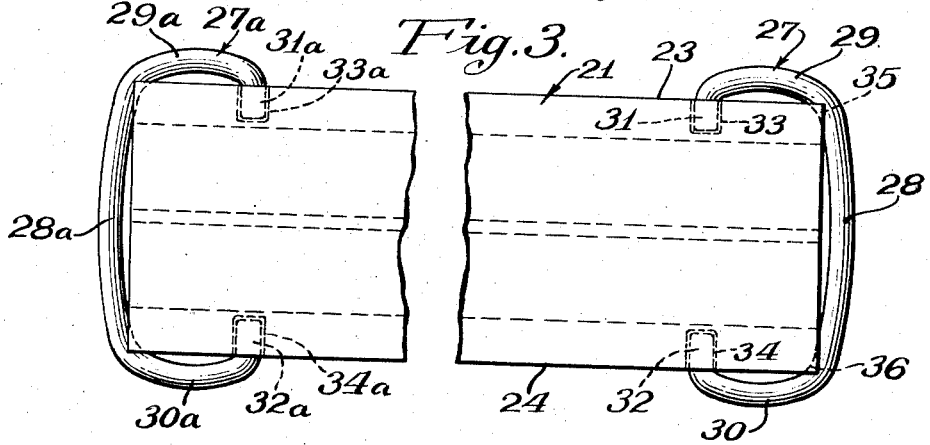
INVENTOR.
Dwight B. Carlson
BY
Paul O. Pippel
Atty.

United States Patent Office 2,852,826
Patented Sept. 23, 1958

2,852,826

CANVAS COUPLER END CLIP

Dwight B. Carlson, Rapids City, Ill., assignor to International Harvester Company, a corporation of New Jersey Application June 7, 1956, Serial No. 589,944

2 Claims. (Cl. 24—31)

This invention relates to a new and improved canvas coupler end clip.

Canvas conveyors and more particularly those used in the farm implement industry are subjected to varying weather conditions making it necessary to be able to easily remove or apply them to various farm implement machines. Harvesting machine platforms generally are equipped with canvas drapers, or feeder conveyors as they are sometimes called, for aggregating the harvested grain and delivering it to a threshing mechanism or depositing it in windrows or the like. In any event, the tautness of the endless canvas conveyor must be relatively uniform throughout all operation of the machine for efficient running thereof. Many means have been devised for joining the ends of a canvas conveyor and, still further, many means have been provided for applying cross slats to these conveyors to facilitate the elevating of grain thereon. Oftentimes the joining means for the ends of the canvas are the same as the cross slat mechanisms. In the present instance we are concerned not only with a mechanism for joining the ends of the canvas conveyor, but rather the means for holding the end-holding means in fixed position so that the canvas ends do not become uncoupled except when desired.

It is a principal object of this invention to provide an end clip for a canvas coupler.

An important object of this invention is the provision of means in a canvas conveyor for joining the rodded ends of the canvas by a sliding coupler and having end clip means engaging the coupler for holding the rods endwise within the coupler.

Another important object of this invention is to supply a coupling means for the ends of a canvas conveyor with spring yielding end clip means whereby the coupler is securely held in position over the abutting ends of the canvas.

Still another important object of this invention is to equip an endless canvas conveyor with looped ends sewn in the adjoining end edges of the canvas conveyor and having rod elements loosely slid into the looped ends whereby the rodded end portions of the canvas abut one another and are held in abutting relationship for forming an endless conveyor by means of a sliding clamp member adapted to encircle a substantial portion of the abutting rodded ends whereby the canvas is made endless, and including an end clip member arranged and constructed to engage notches in the sides of the coupler member and to extend around the end of the rods thereby preventing lateral separation of the coupler and the rods.

Other and further important objects and advantages will become apparent from the disclosures in the following specification and accompanying drawings.

In the drawings:

Figure 1 is a perspective view of the canvas coupler and end clip of this invention.

Figure 2 is an end view of the device as shown in Figure 1.

Figure 3 is a top plan view of the device as shown in Figures 1 and 2.

As shown in the drawings, the reference numeral 10 indicates generally a canvas conveyor or the like having opposed ends 11 and 12. The ends 11 and 12 of the canvas strip 10 are turned back upon the body of the conveyor 10 forming loops 13 and 14, respectively, in the ends thereof. These turned back portions 15 and 16 are sewn as shown at 17 and 18 to the main body portion of the conveyor 10 thereby making the end loops 13 and 14 relatively permanent in the canvas conveyor.

Steel rods, or the like, 19 and 20 are adapted to be slid into the end loops 13 and 14, respectively, thereby making the adjoining or abutting ends of the canvas relatively rigid and providing a means for holding the ends together in the formation of an endless conveyor.

The coupler element 21 is adapted to be slid over the rodded ends of the canvas thereby holding the ends together and making an endless conveyor. The cross-sectional shape of the coupler 21 is best shown in Figure 2 wherein it includes a top portion 22 extending across the full surface of the rodded ends of the canvas and having side portions 23 and 24 extending downwardly toward the surface of the canvas 10. The lower ends of the sides 23 and 24 are equipped with inwardly extending projections 25 and 26 which extend inwardly beneath a portion of the abutting rods 19 and 20. This prevents vertical removal of the coupler 21 and requires a sliding of the coupler 21 into position over the rods rather than any other means of mounting. Such a device has been in commercial use for some time and although it is quite successful, there is always the problem of the rods 19 and 20 being jostled or slid outwardly from the end loops 13 and 14 whereby the juncture of the canvas ends is broken. It will be seen that with the coupler channel member overlapping the rodded ends of the canvas 10 the rods 19 and 20, or the coupler 21, may have relative sliding movement one with the other so that the canvas ends might be properly joined one to the other. It is a function of the device of this invention to employ spring end clips 27 and 27a which are for the purpose of providing an end retaining wall for the coupler element 21 and to prevent relative sliding movement of the coupler 21 with respect to the rodded ends of the canvas. The end clips 27 and 27a include an end portion 28 with flanking sides 29 and 30. The end clips are preferably made of spring rod material so that the C clamp which it forms may be sprung outwardly to enable engagement and disengagement with the slidable coupler member 21. The sides 29 and 30 each have inward extensions 31 and 32 which are opposed to one another and are in general axial alignment with one another. As best shown in Figures 1 and 3, the inwardly extending projections pass into openings or holes 33 and 34, respectively, in the sides 23 and 24 of the coupler 21. Thus the end clips 27 and 27a are securely held from endwise movement by the engagement of the projections 31 and 32 within the socket-like holes 33 and 34 in the sides of the U-shaped coupler element 21. The end clips are prevented from rocking about the projections 31 and 32 as a hinge by means of notches 35 and 36 in the sides 23 and 24 of the coupler at the ends thereof. Thus the end clips 27 and 27a are held at two points on each of the vertical sides 23 and 24 of the coupler. On the one side the clip is anchored by the hole 33 and the notch 35 and on the other side the clip is held by the hole 34 and the notch 36. It will thus be seen that the end clips 27 and 27a securely hold the rod members 19 and 20 against endwise movement relative to the canvas conveyor 10 or to the U-shaped coupler 21. For purposes of convenience the elemental parts of the locking clip 27a shall be given the same reference numerals as the parts for the end clip 27 with an "a" added to each one. The canvas coupler of this invention with the end locking clips in combination hold the rods 19 and 20 in their fixed relative positions.

In the operation of the device of this invention the canvas coupler 21 is applied over the rodded ends of the canvas 10 by sliding thereover. The inwardly projecting portions 25 and 26 of the coupler 21 perform the locking means for the ends of the canvas whereby they are held against separate endwise movement. The end locking clips are then snapped into place by causing the inward projections 31 and 32 thereof to be snapped into the side openings 33 and 34, respectively, of the coupler 21. Similarly, the end clip 27a has its inward projections 31a and 32a snapped into the sockets or openings 33a and 34a, respectively. When the end clips 27 and 27a are in fixed position as shown in Figures 1, 2 and 3 the canvas 10 is a complete endless conveyor and may not be separated until such time as at least one of the end clips 27 or 27a is removed by spreading thereof and pulling the inwardly extending projections 31 and 32 out from the openings 33 and 34. Following this, the coupler 21 may be slid endwise off the rodded ends of the canvas whereupon the canvas ends may be separated as desired.

It is believed that herein is provided a novel and efficient article for canvas couplers enabling a simple coupler to be employed without fear of losing the metal rods 19 and 20 which must be used to reinforce the ends of the canvas. Various details of construction may be made throughout a wide range without departing from the principles disclosed herein and I, therefore, do not propose limiting the patent granted hereon otherwise than as necessitated by the appended claims.

What is claimed is:

1. A canvas coupler comprising a U-shaped member adapted to slidably engage and hold against separate longitudinal movement the rodded ends of a canvas conveyor, and including means locking the coupler against slidable movement with respect to the rodded ends of the canvas, said means locking including spring clips spanning the ends of said U-shaped member and having means for holding said spring clips in fixed position, and said U-shaped member having holes in opposite sides thereof adjacent its ends, and said spring clips having inward projections at their ends adapted to engage said holes and having their central portions covering and holding the rodded ends of the canvas coupler in fixed position.

2. A device as set forth in claim 1 in which said U-shaped member has notches in opposite corners of the ends thereof, and whereby the central portions of the spring clips are arranged and constructed to snugly engage said notches when the inward projections are in engagement with said holes.

References Cited in the file of this patent

UNITED STATES PATENTS

| 720,782 | Chilcote | Feb. 17, 1903 |
| 1,898,650 | Whiteker | Feb. 21, 1933 |
| 2,687,209 | Rost | Aug. 24, 1954 |

FOREIGN PATENTS

| 3,830 | Sweden | Mar. 21, 1892 |
| 4,428 | Great Britain | 1904 |
| 272,560 | Switzerland | Mar. 16, 1951 |